(12) United States Patent
Bhatia et al.

(10) Patent No.: US 6,502,754 B1
(45) Date of Patent: *Jan. 7, 2003

(54) DATA ACQUISITION DEVICE

(75) Inventors: Sudhir Bhatia, Brooklyn, NY (US); Joerg Schlieffers, Setauket, NY (US); Gregory G. Jones, Seattle, WA (US); Mark Knighton, Santa Monica, CA (US); John Zheng, San Gabriel, CA (US); David Drobnis, Mar Vista, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/512,902

(22) Filed: Feb. 25, 2000

Related U.S. Application Data

(63) Continuation-in-part of application No. 09/436,169, filed on Nov. 9, 1999, now Pat. No. 6,123,265.
(60) Provisional application No. 60/116,005, filed on Mar. 1, 1999.

(51) Int. Cl.[7] .................................................. G06K 7/10
(52) U.S. Cl. .............................. 235/472.01; 235/462.45
(58) Field of Search ....................... 235/462.45–462.48, 235/472.01, 472.02, 454, 462.01

(56) References Cited

U.S. PATENT DOCUMENTS

| | | | |
|---|---|---|---|
| 4,165,554 A | 8/1979 | Faget | 235/1 D X |
| 4,825,057 A | 4/1989 | Swartz et al. | 235/472 |
| 5,092,793 A | 3/1992 | Stephen | 23/472 X |
| 5,335,170 A | 8/1994 | Petteruti et al. | 235/472 X |
| 5,349,497 A | 9/1994 | Hanson et al. | 235/472 X |
| 5,378,882 A | 1/1995 | Gong et al. | 235/472 |
| 5,410,141 A | 4/1995 | Koenck et al. | 235/472 |
| 5,589,679 A | 12/1996 | Dvorkis et al. | 235/472 |
| 5,594,232 A | 1/1997 | Giordano | 235/472 |
| 5,600,121 A | 2/1997 | Kahn et al. | 235/472 |
| D387,753 S | 12/1997 | Stewart et al. | D14/116 |
| D387,754 S | 12/1997 | Stewart et al. | D14/116 |
| 5,828,052 A | 10/1998 | Reynolds et al. | 235/472 |
| 5,900,110 A * | 5/1999 | Goodwin et al. | 156/577 |
| 5,979,770 A * | 11/1999 | Schlieffers et al. | 235/472.01 |
| 5,996,896 A * | 12/1999 | Grabon | 235/472.01 |
| 6,000,612 A * | 12/1999 | Xu | 235/454 |
| 6,123,265 A * | 9/2000 | Schlieffers et al. | 235/472.01 |
| 6,244,513 B1 * | 6/2001 | Schlieffers et al. | 235/472.01 |

FOREIGN PATENT DOCUMENTS

JP     07311812 A  * 11/1995  ............ G06K/7/10

OTHER PUBLICATIONS

Vivitar Corporation WJ2000 Python literature.

* cited by examiner

Primary Examiner—Michael G. Lee
Assistant Examiner—Jamara A. Franklin

(57) ABSTRACT

A data acquisition device is provided. The component parts of the device are configured according to certain specified angles which increase data acquisition throughput and reduce physical stress on the user.

27 Claims, 6 Drawing Sheets

THE SYMBOL
PDT 7200

DATA ACQUISITION DEVICE

CROSS-REFERENCE TO RELATED APPLICATIONS

This application is a continuation-in-part of U.S. patent application Ser. No. 09/436,169, filed Nov. 9, 1999 now U.S. Pat. No. 6,123,265, and claims priority from U.S. Provisional Application No. 60/116,005, filed Mar. 1, 1999, which are hereby incorporated by reference herein in their entirety.

BACKGROUND OF THE INVENTION

This invention relates to hand-held devices for acquiring data, and particularly to optical code reading devices and other image capture devices.

Many of the devices for optical code reading and image capture include keypads. These keypads can be either virtual—i.e., shown as a keypad picture on a touch-sensitive screen—or actual.

It would be desirable to provide a hand-held data acquisition device which has an improved ergonomic arrangement.

SUMMARY OF THE INVENTION

It is an object of this invention to provide a hand-held data acquisition device which has an improved ergonomic arrangement.

A data acquisition device according to the invention includes a body portion having a data acquisition module arranged to scan objects—e.g., using a bar code scanner, image capture apparatus, RFID transmitter and receiver or other suitable information acquisition device. The body portion has a central optical axis which is directed outward from the distal end of the device. The body portion also includes an upper surface having a display mounted thereon. The plane of the display is positioned at a first angle with respect to the axis.

The device also includes a handle portion extending from a bottom surface of the body portion. The handle portion is joined to the body portion at a location near the distal end at a second angle with respect to the body portion.

Preferably, the first angle and the second angle allow viewing of the display portion and scanning at least one of the objects to occur substantially simultaneously.

In another embodiment of the invention, the hand-held data acquisition device includes a first high-friction element located between the upper body portion and the handle. The first element has at least one generally straight face. The device also includes a second high-friction element preferably located in the handle. The second high-friction element has a generally straight face, whereby the face of the first element and the face of the second element combine to provide a set of high-friction rest points for the device. These rest points limit the movement of the device when it is placed in a rest position—e.g., when it is laid on its side.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout.

DETAILED DESCRIPTION OF THE INVENTION

In one aspect of the invention, the optimum angles and ranges of angles for the data acquisition line of orientation—e.g., the central optical axis of the bar code scanner or other suitable image capture device—with respect to the plane of the view screen and the central longitudinal axis of the handle are provided for a handle-forward—i.e., where the handle is attached to the distal end of the upper portion of the device—data acquisition device. The primary issues to be addressed in determining the proper angles and ranges of angles include scanner throughput, wrist posture and wrist movements.

High scanner throughput requires that the display be easily viewable by the user so the user can easily access the display while continuing to acquire data. Easy display viewability also reduces wrist stress because it limits the number of required wrist movements. Utilizing an optimum angle for the display portion increases efficiency, and, therefore, scanner throughput. In addition, utilizing an optimum angle between the handle portion and the upper portion improves wrist posture during use and, therefore, also reduces wrist stress.

Figure 1:
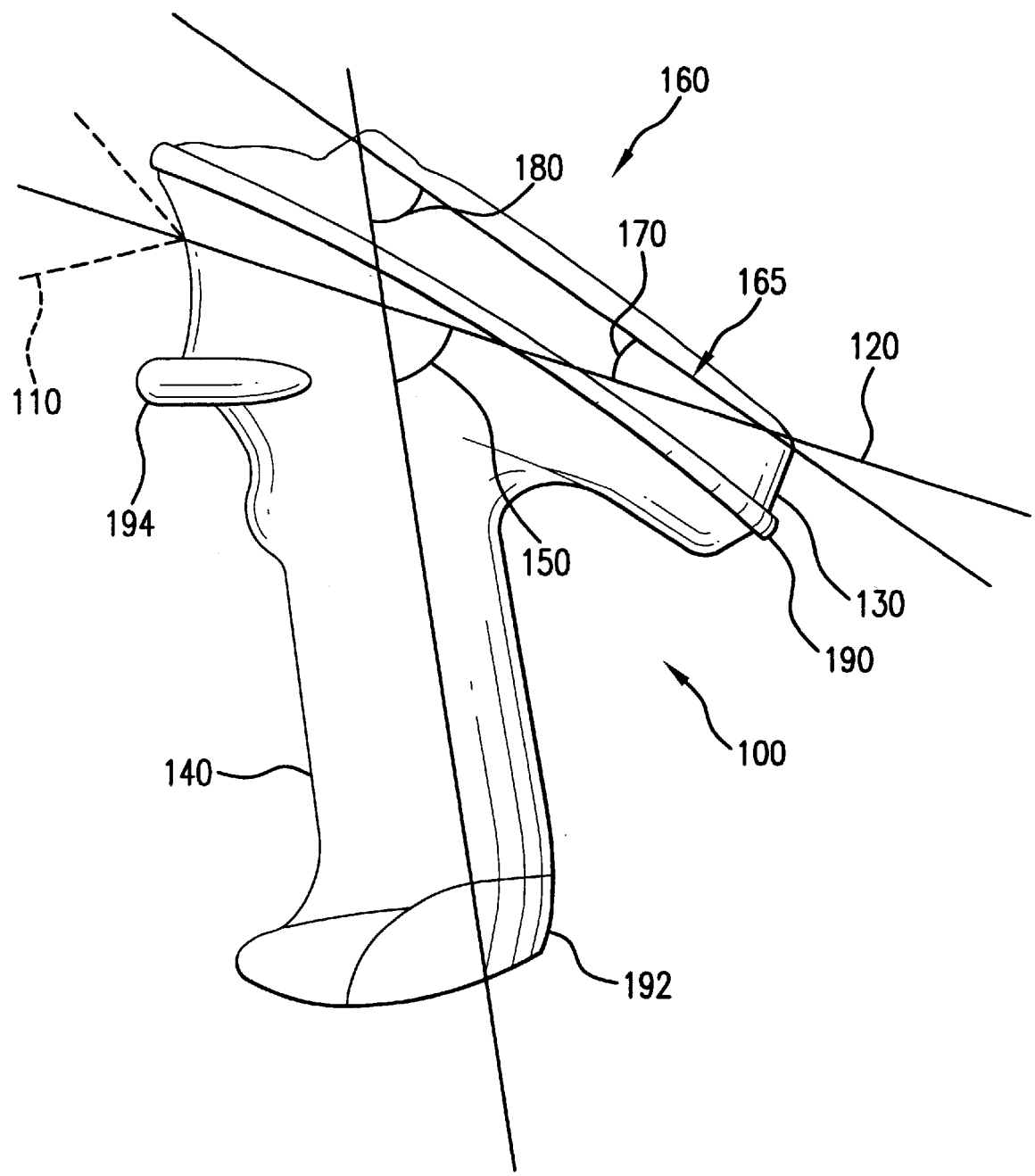
FIG. 1 is a side view of a data acquisition device according to the principles of the invention.

FIG. 1 shows a data acquisition device 100 according to the invention. The device provides a data acquisition beam 110—e.g., a laser beam for use in scanning or image capture—from the distal end of device 100. Data acquisition beam 110 can be either a one-dimensional beam, as with a bar-code laser, or a multi-dimensional beam. A data acquisition axis 120 is provided along a central axis of this beam. It is with respect to this axis 120 that the other angles are illustrated.

Handle 140 is connected to upper portion 130 near the distal end of device 100 at a particular angle 150 with respect to axis 120. The preferable range of angle 150 is from 57.0° to 72.0°, and the most preferable angle is 64.5°.

Display 160 is preferably mounted such that a planar surface 165 of display 160 is at a particular angle 170 with respect to axis 120. The preferable range of angle 170 is from 14.0° to 31.0°, and most preferably 17.5°.

Finally, display 160 is preferably adjoined at a particular angle 180 with respect to handle 140. The preferable range of angle 180 is from 33.5° to 50.5°, and most preferably 42.0°.

The preferable ranges and angles have been determined by thorough ergonomic testing and field studies directed towards determining rate of throughput and corresponding physical stress for a particular device configuration.

In another aspect of the invention, the data acquisition device provides high-friction—e.g., rubber or other suitable high-friction material—surfaces substantially around and about the housing of the device. Therefore, when the device is placed in a rest position on a surface, the high-friction surfaces of the device tend to inhibit movement of the device and prevent the device from falling off the surface.

The device shown in FIG. 1 includes a number of high-friction surfaces. The surface in the embodiment shown in FIG. 1 includes gasket 190, base 192 and foot 194. In addition, a high-friction boot (not shown) may be fitted over the display such that high-friction rest points are preferably provided in any rest position of the device.

Figure 2:
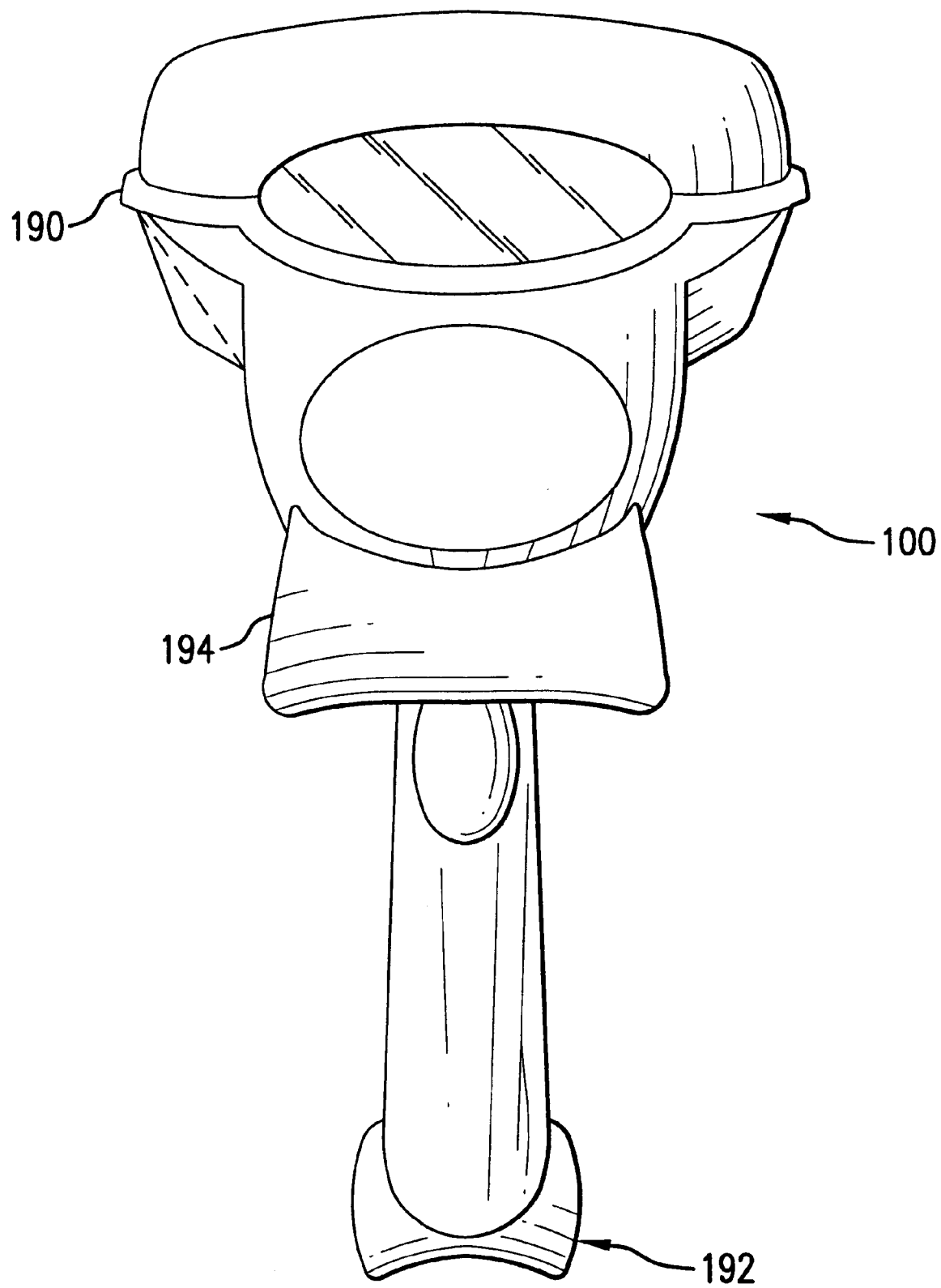
FIG. 2 is a front view of a data acquisition device according to the principles of the invention.
Figure 3B:
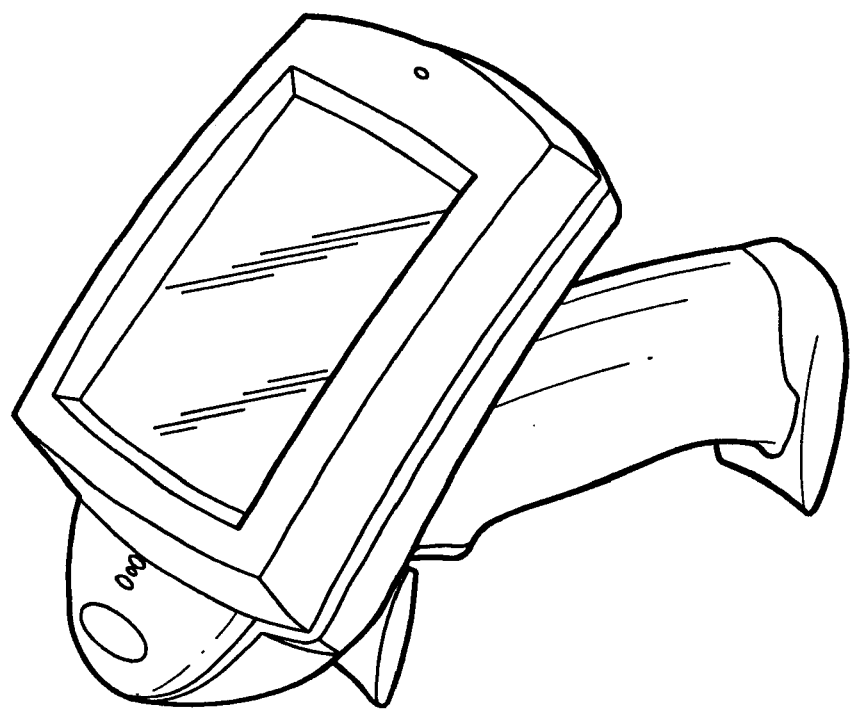
FIG. 3B is another perspective view of a data acquisition device according to the invention.
Figure 3A:
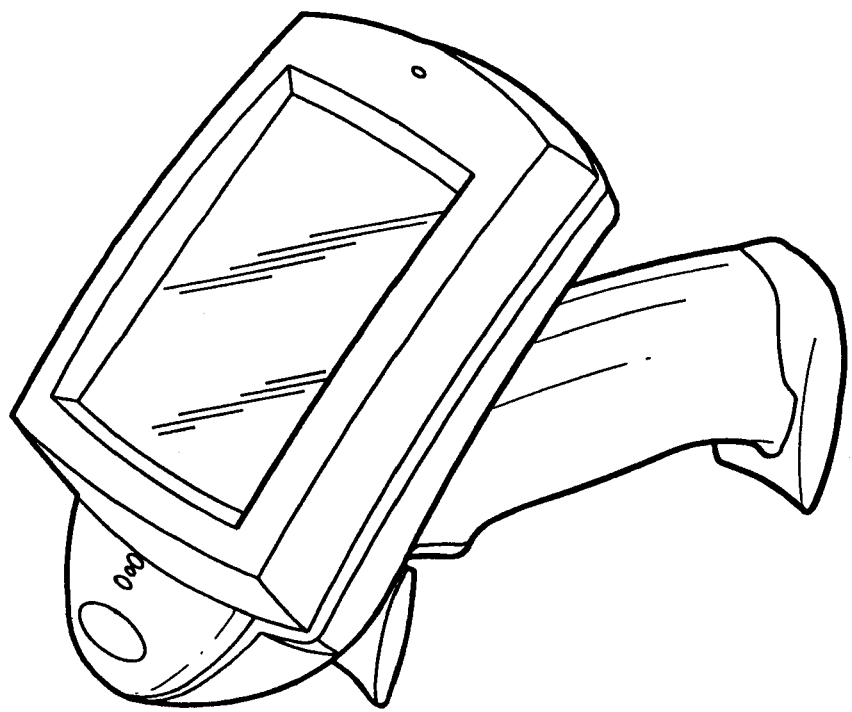
FIG. 3A is a perspective view of a data acquisition device according to the invention.

FIG. 2 shows a front view of data acquisition device 100. From this view, as well as from the side view shown in FIG. 1, it is shown that generally straight faces located on each of gasket 190, base 192 and foot 194 may be used to provide rest points for data acquisition device 100 when device 100 is laid on its front, back, left side or right side.

Another aspect of the invention relates to user feedback from the keypad of the data acquisition device. Upon actuation of a key in a conventional keypad, the user may be informed of successful actuation by a sound feedback. In one aspect of the invention, a vibrating motor is contained within the data acquisition device to provide tactile feedback to a user upon actuation of a key. This aspect of the invention is useful in noisy environments where sound feedback may not provide sufficient feedback to the user.

Furthermore, the resonating frequency of the vibrating motor can preferably be matched to the resonating frequency of the data acquisition device. By matching the resonating frequency of the vibrating motor to the resonating frequency of the data acquisition device, the tactile force of the vibrating motor is amplified.

In another aspect of the invention, the data acquisition device includes an ability to provide a platform for voice communication. Thus, the device can serve as a portable phone (the phone can be either wireless or hard-wired), a walkie-talkie, or a record and play device—e.g., a tape recorder. In one embodiment of the platform, a speaker and a microphone for voice communications can be positioned on the device such that the user has access to the speaker and microphone while viewing the display screen.

Figure 6:
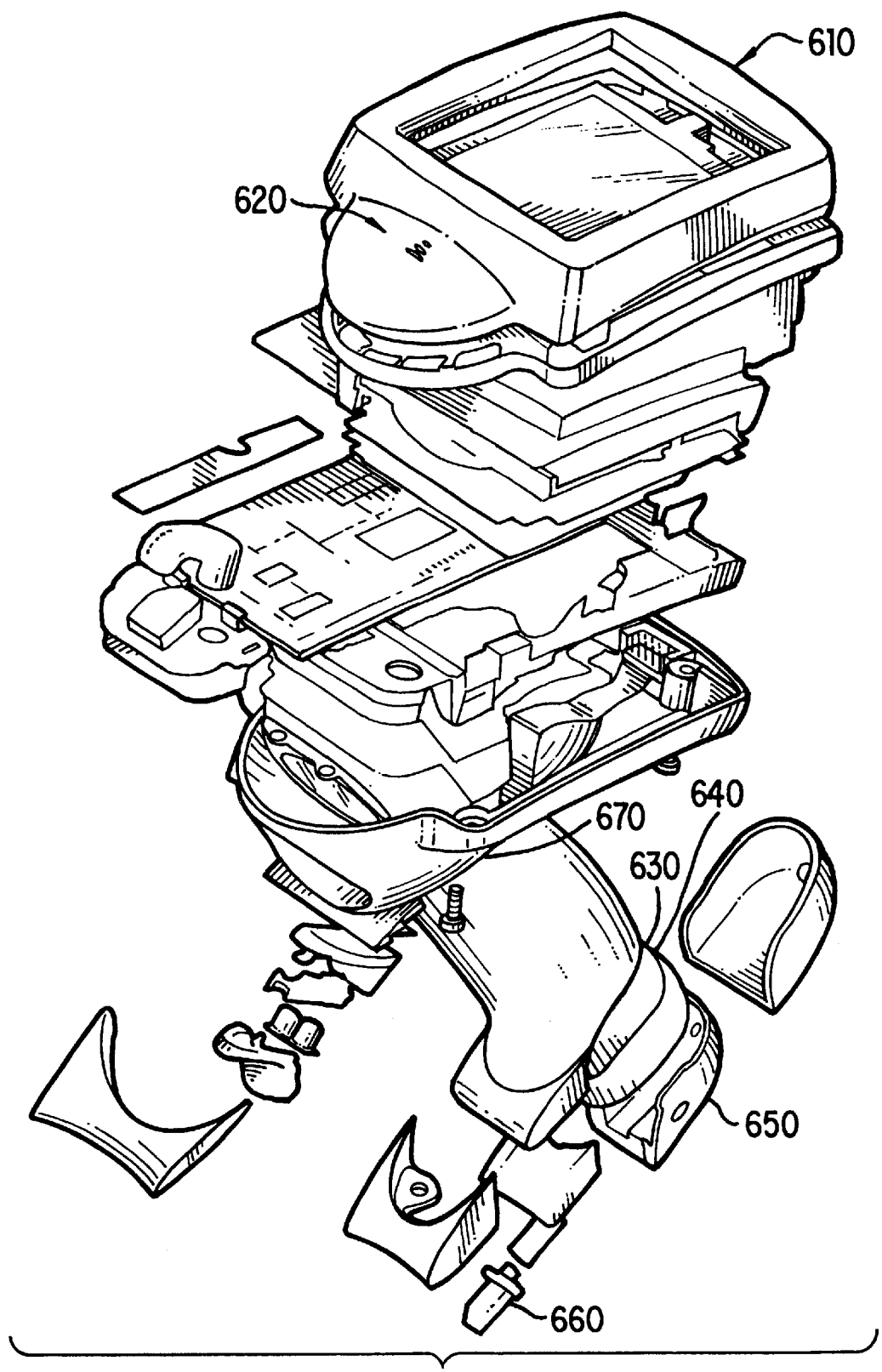
FIG. 6 is an exploded perspective view of the transmission according to the invention.

FIG. 6, which is an exploded perspective view of the invention, shows one possible location of the speaker 610 and microphone 620. As mentioned above, this location provides the advantage that the user can utilize the speaker and microphone while viewing the display screen.

Other aspects of the invention relate to the implementation of the trigger on the data acquisition device. In one embodiment of the invention, the display screen, when implemented as a touch-sensitive device, provides a virtual keyboard upon depression of the same trigger that signals the device to perform data acquisition. In addition, the display screen may provide programmable variations of the keyboard or other visual information displayed thereon for the user as required.

One possible way to implement this is to provide a preferably single-finger multiple-position trigger which, in a first position, signals the device to perform data acquisition and, in a second position signals the display screen to provide a virtual keyboard, or to display other visual information. One example of this implementation is a trigger having a rocker switch wherein the switch is actuated in a number of different positions, thereby causing a number of different results—e.g., performance of a data acquisition, or, alternatively, implementing a particular keypad configuration.

Another way to implement multiple functions in a trigger device is to provide two separate triggers which are actuated by different fingers. One of the triggers can be used for signaling the device to perform a data acquisition and the other can be used to signal the display screen to provide a virtual keyboard, or other visual information.

Another way to implement multiple functions in a trigger-type data acquisition device is to provide a trigger for signaling the device to perform a data acquisition and a wheel for changing the configuration of the display screen. The wheel can be located on the device such that the wheel can be actuated by the thumb of the user or a finger of the user other than the trigger finger.

In another aspect of the invention, the trigger may be implemented using a field-replaceable trigger module. Thus, a user in the field can preferably remove and replace the trigger module in a data acquisition unit without violating the seal of display device unit. This is important because, when the trigger fails, the trigger module can be replaced without having to send the data acquisition device to the original equipment manufacturer.

In another aspect of the invention, the display screen, when implemented as a touch-sensitive screen, can be configured to combine analog and digital operation. In one embodiment of this aspect, a portion of the touch-sensitive display screen can be dedicated to a digital process, such as turning the screen ON or OFF, while the remaining portion of the screen can be dedicated to an analog process such as recording all the information that is pressed onto the screen—e.g., recording a signature executed onto the screen using a stylus or other writing device.

Figure 5:
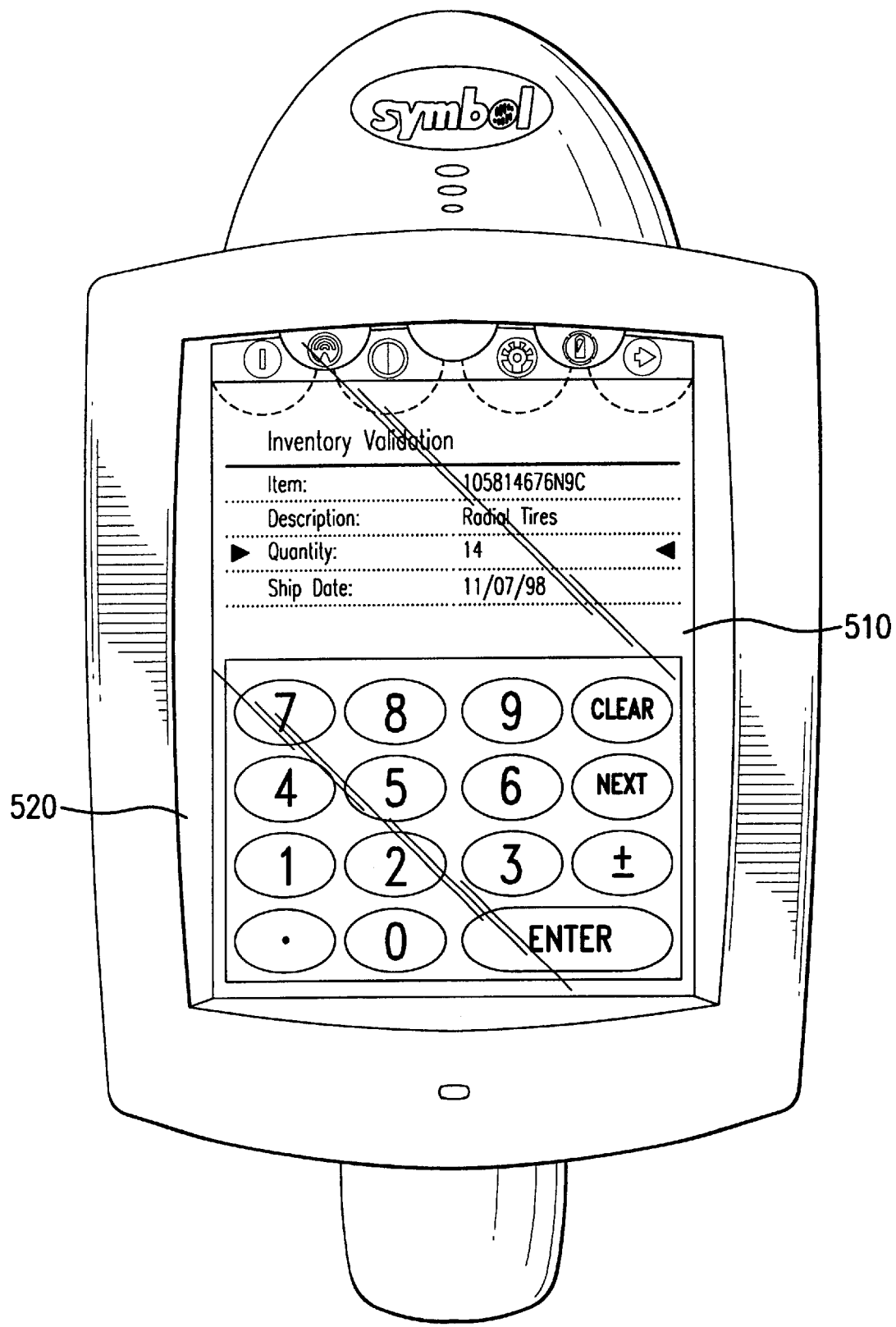
FIG. 5 is a top view of a data acquisition device according to the invention.

FIG. 5 shows a top view of the data acquisition device according to the invention. The display screen 510 may preferably be configured for analog input operation. However, the dotted circles 520 at the top of the display screen which indicate overall selection zones for control icons, may be implemented for digital input operation.

This combination digital/analog aspect of the invention is useful, for example, to control the system when the analog data processing portion of the device malfunctions. In such a circumstance, the screen could be shut OFF without requiring total system shutdown.

In another aspect of the invention, a modular key input device can be added to the display screen of the invention in order to allow the display screen to support a full hard keyboard. The key input device preferably includes locking devices to secure the key input device to the display screen. When installed, the key input device is located over the touchpad or digitizer of the terminal. Preferably, depressing the hard keycaps on the input device actuates the corresponding region on the touchpad or digitizer.

The hard keypad may also preferably include a clear, see-through, region. The clear region preferably exposes a portion of the display screen for limited graphics information. In one embodiment of this clear region, up to 20 lines of alphanumeric characters can be displayed in this visible area. This clear area may preferably be recessed in relation to the hard keys for protection from impact and abrasion without compromising readability of the exposed portion of the display screen.

The key input device may preferably be comprised of a key membrane captured within upper and lower housing halves. The housing halves may preferably be formed from plastic and ultrasonically welded together to capture the key membrane.

The key membrane includes the keys, webbing support for the keys, and actuators. The keys are depressed by the user and can be formed from hard rubber. In the alternative, molded plastic caps can be formed on the keys. In either case, a user preferably interfaces with a substantially hard keyboard.

The webbing portion of the membrane may be configured to provide tactile feedback to keyboard users when a key is depressed.

Actuators on the membrane may preferably extend beneath each key and contact the terminal touchpanel or digitizer as each key is depressed. A benefit of this configuration is that it is passive and, therefore, requires no additional unit power.

The portion of the actuator that contacts the display screen may preferably be formed from rubber. Thus, upon contact with the display screen, the rubber actuator material will not abrade or cut the display screen surface.

When a key is depressed, the display screen software preferably senses the actuator depression point at that particular location. The software for the display screen can be designed to accommodate different key configurations, layout and function assignments.

In another aspect of the invention, an LED backlight of the display screen is embedded with independent light guides (devices designed to transport light from a light source to a point at some distance with minimal loss) that channel light from the CPU to certain portions of the backlight thereby providing discrete areas within the display screen which can be illuminated without illuminating the entire backlight.

In another aspect of the invention, the battery is secured in the handle by a gun-magazine like clip. FIG. 6 shows a can portion 630 for containing the battery element, a base plate 640, a slide 650 at the bottom of base plate 640 and latch 660. To pull latch 640 away from the handle, which, thereby, allows the battery to be removed, base plate 640 must be unlocked preferably by depressing dimples on the side of the base, and then slid away from a central longitudinal axis of the handle. After base plate 620 is unlocked and slid away, it can then be pulled along the central longitudinal axis and the battery can be removed from the handle.

In another aspect of the invention, a locking system for software that allows programmability of the device is provided. This particular software, without which the device cannot be programmed or modified, is protected by a lock that requires a higher voltage than the battery is capable of providing. Thus, for this software itself to be programmed, a special voltage must be fed into the data acquisition device (e.g., 10 volts as opposed to the 8.4 voltage limit of the battery). After this higher voltage is fed into the data-acquisition device, the software code which controls programmability of the data acquisition device—e.g., the code for programming possible keypad implementations—can be unlocked and then programmed.

In conventional start-up software, once an error is detected, the system must be restarted under different conditions to correct the error. In another aspect of the invention, start-up software that detects the error on start-up and puts the system in a condition that correction enabling code can be implemented is provided. The software is configured to recognize the existence of a start-up error and place the system in a condition for correction implementation.

In another aspect of the invention, a flexible attachment which provides power supply to the data acquisition module—e.g., a bar code scan engine—is provided. Typically, data acquisition modules differ in their required voltage level. For example, one module may require a three volt supply while another may require a five volt supply. In order to supply the correct voltage from the microprocessor, which includes various voltage supplies, to the data acquisition module, the flexible attachment between the two is configured to be data acquisition module specific. Thus, the flexible attachment preferably attaches to specific pins of the microprocessor such that the data acquisition module is supplied with the power required for its individual implementation. A microprocessor decision is not required to accurately supply the data acquisition module with the required voltage. Ultimately, this is a hardware approach to satisfying power requirements of a data acquisition module resident in a data acquisition device.

In another aspect of the invention, the keypad is software-based. This allows configurability and designability of the look and function of the keypad.

Figure 4:
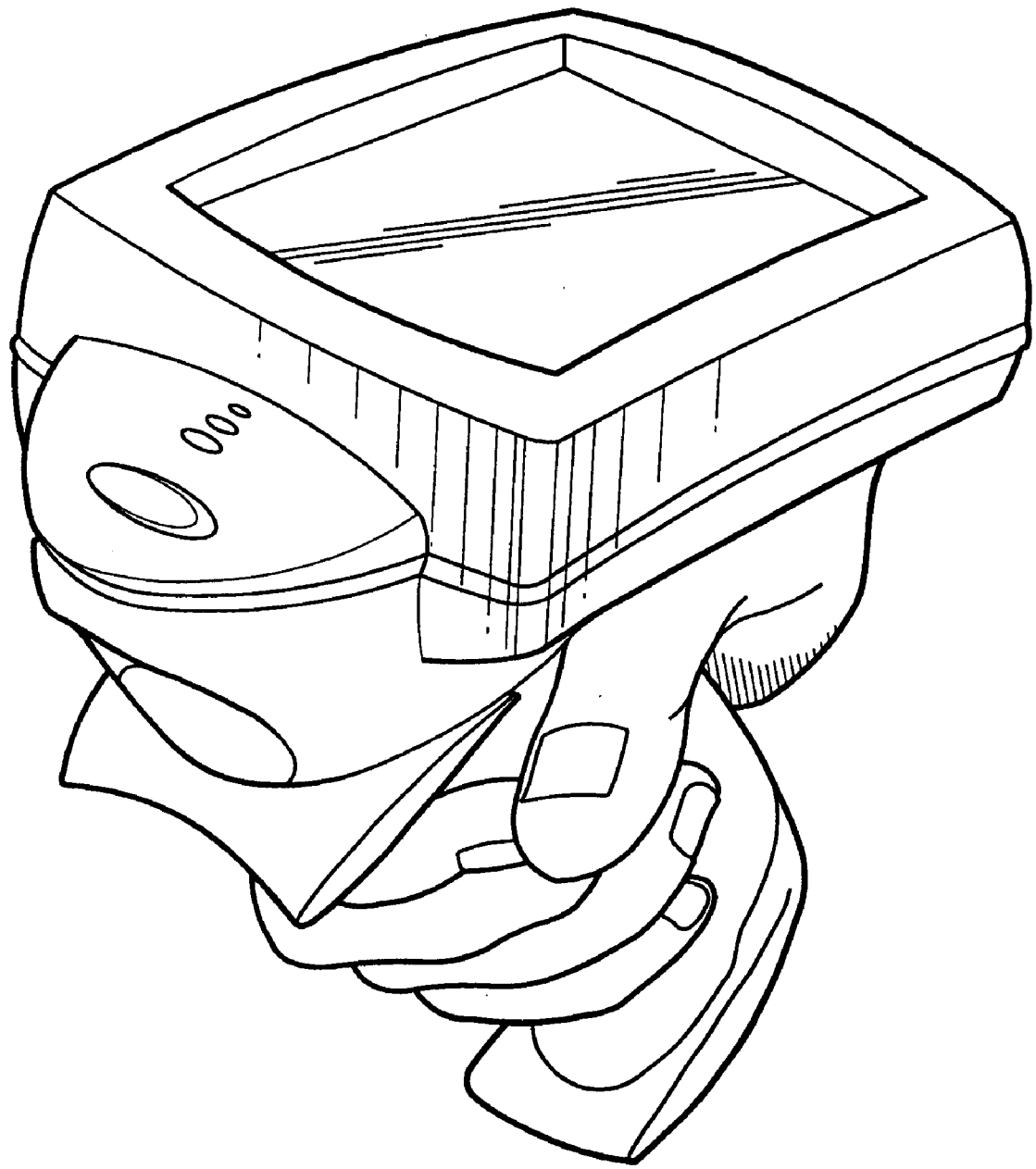
FIG. 4 is yet another perspective view of a data acquisition device according to the invention.

Another aspect of the invention is the attachment of the handle to the distal end of the data acquisition device. Also located on the distal end of the data acquisition device is an outwardly facing data acquisition module. When the data acquisition device 100 is held in an operator's hand 410, as shown in FIG. 4, the handle arrangement causes the proximal end of the body portion to extend over the radial surface of the user's hand such that the lower surface of the body portion rests on and is supported by the radial hand surface. In this arrangement, the weight of body portion is easily supported by the user during operation of the scanning device.

In an alternative embodiment of the handle according to the invention, the handle is made to conform to a user's hand—e.g., in an egg-shaped construction—such that the stress on the user's hand is reduced. FIG. 4 shows the hand of the user gripping the handle of the data acquisition device. In FIG. 6, a portion of the egg-shaped construction 670 can be seen.

When the user enters data by operating the keypad, the body portion is firmly supported by the radial hand surface against the force of key strokes, avoiding a tendency to exert unsupported force on the handle grip of the user which would require a greater gripping force and transmit a greater moment to the arm of the user.

In another aspect of the invention, a combination of pager/telephony/access points allow a user of the data acquisition device to access either a LAN (local access network) or a WAN (wide access network) with voice over IP capability. Thus, the user of the data acquisition device can access any resources in his particular local network, or can be connected to the Internet or other resource through the WAN. In one embodiment of the device, an internal RF antenna is used to communicate with the LAN or the WAN.

In another embodiment of the invention, the data acquisition device can be equipped with a communications port located at the base of the handle.

Preferably, the data acquisition device utilized a Lithium Ion polymer battery.

In another aspect of the invention, the housing of the data acquisition device includes a slot for upgrade of functionality or increase memory. This type of slot may be used with a PCMCIA card or other miniaturized cards such as a compact flash card.

A data acquisition module for reading optically-encoded indicia or other types of optical images according to the invention may preferably include a laser scanner or a solid state imaging scanner. The laser can be a one-dimensional laser scanner for reading bar codes or a two-dimensional scanner for reading one and two-dimensional indicia. A solid-state imaging scanner can be a one or two-dimensional CCD (charge-coupled device) or CMOS-based scanner.

Finally, the data acquisition device can provide RFID (Radio Frequency Identification) functionality. The RFID device may preferably include a transceiver for sending electromagnetic energy toward a target radio-frequency tag.

The radio-frequency tag could be a passive tag or an active tag. The energy transmitted to the passive tag is received by the tag and re-transmitted back to the data acquisition device. In the case of the active, tag, the tag responds to the energy with data and sends the data to the data acquisition device. In both cases, the devices receive some information about the interrogated tag.

Thus, a data acquisition device that increases acquisition throughput and reduces wrist stress is provided. Persons skilled in the art will appreciate that the present invention can be practiced by other than the described embodiments, which are presented for purposes of illustration rather than of limitation, and the present invention is limited only by the claims which follow.

What is claimed is:

1. A hand-held data acquisition device comprising:
    a body portion having a data acquisition module arranged to scan objects in a direction, said direction being outward from a first distal end and having a central data acquisition axis, said body portion including an upper surface having a display mounted thereon;
    a handle portion extending from a bottom surface of said body portion, said handle portion being joined to said body portion at a location near said distal end at a selected angle with respect to said axis to cause a proximal end of said bottom surface to rest on a radial surface of a user's hand when the user grasps the handle portion; and
    wherein said selected angle allows viewing of said display portion substantially simultaneously with scanning at least one of said objects.

2. The insert of claim 1 wherein the angle is greater than 57°.

3. The insert of claim 1 wherein the angle is between about 57° and about 72°.

4. The insert of claim 1 wherein the angle is about 64.5°.

5. The insert of claim 1 wherein the angle is less than 72°.

6. A hand-held data acquisition device comprising:
    a body portion having a data acquisition module arranged to scan objects, said body portion having a data acquisition axis which is directed outward from a first distal end, said body portion including an upper surface having a display mounted thereon, said display being at a first angle with respect to said axis;
    a handle portion extending from a bottom surface of said body portion, said handle portion being joined to said body portion at a location near said distal end at a second angle with respect to said axis; and
    wherein said first angle and said second angle allow viewing of said display portion and scanning at least one of said objects to occur substantially simultaneously.

7. The device of claim 6 wherein the first angle is greater than 14°.

8. The device of claim 6 wherein the first angle is between about 14° and about 31°.

9. The device of claim 6 wherein the first angle is about 17.5°.

10. The device of claim 6 wherein the first angle is less than 31°.

11. The device of claim 6 wherein the second angle is greater than 57°.

12. The device of claim 6 wherein the second angle is between about 57° and about 72°.

13. The device of claim 6 wherein the second angle is about 64.5°.

14. The device of claim 6 wherein the second angle is less than 72°.

15. The device of claim 6, wherein the handle is at a third angle to the display, the third angle being greater than 33.5°.

16. The device of claim 15, the third angle being between 33.5° and 50.5°.

17. The device of claim 15, the third angle being between about 42°.

18. The device of claim 15, the third angle being between less than 50.5°.

19. A hand-held data acquisition device comprising:
    a body portion having a data acquisition module arranged to scan objects, said body portion having a data acquisition axis which is directed outward from a first distal end, said body portion including an upper surface having a display mounted thereon, said surface being at a first angle with respect to said axis;
    a handle portion extending from a bottom surface of said body portion, said-handle portion being joined to said body portion at a location near said distal end at a second angle with respect to said axis; and
    wherein, when a user grasps the handle portion and directs the axis away from the user, said first angle causes the display portion to be user-viewable and said second angle causes a proximal end of said bottom surface to rest on a radial surface of a user's hand.

20. A hand-held data collection device comprising:
    an upper body portion;
    a handle;
    a first high-friction element located proximal to said upper body portion, said first element having a generally straight face; and
    a second high-friction element located proximal to the handle, said second high-friction element having a generally straight face, whereby the face of the first element and the face of the second element combine to provide a set of high-friction rest points for the hand-held data collection device.

21. The hand-held device of claim 20 wherein the upper body portion includes a display.

22. The hand-held device of claim 20 wherein the upper body portion includes a data input device.

23. The hand-held device of claim 20 wherein the contoured handle includes a trigger for activating a machine code reader.

24. The hand-held device of claim 20 wherein the contoured handle encases a battery pack.

25. The hand-held device of claim 20 wherein the first high-friction element is a high-friction gasket between the upper portion and the handle.

26. The hand-held device of claim 20 wherein the second high-friction element is a high-friction base on the bottom of the handle.

27. The hand-held device of claim 20 wherein the second high-friction element is a high-friction foot proximal to a connection of the base and the handle.

* * * * *